United States Patent
Son

(10) Patent No.: US 8,818,628 B2
(45) Date of Patent: Aug. 26, 2014

(54) SYSTEM AND METHOD FOR CONTROLLING INTEGRATED NETWORK OF A VEHICLE

(71) Applicants: Hyundai Motor Company, Seoul (KR); Kia Motors Corporation, Seoul (KR)

(72) Inventor: Jung Duck Son, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/727,069

(22) Filed: Dec. 26, 2012

(65) Prior Publication Data

US 2014/0081518 A1    Mar. 20, 2014

(30) Foreign Application Priority Data

Sep. 17, 2012   (KR) .......................... 10-2012-0102853

(51) Int. Cl.
*G06F 7/00*    (2006.01)
*G06F 1/26*    (2006.01)
*H04L 12/28*   (2006.01)

(52) U.S. Cl.
USPC .......................... 701/36; 713/320; 370/395.42

(58) Field of Classification Search
USPC .......................... 701/36; 713/320; 370/395.42
See application file for complete search history.

(56) References Cited

U.S. PATENT DOCUMENTS

| | | | |
|---|---|---|---|
| 7,539,888 B2 * | 5/2009 | Hu et al. ........................ | 713/324 |
| 8,582,579 B2 * | 11/2013 | Yousefi et al. ............ | 370/395.42 |
| 2009/0217070 A1 * | 8/2009 | Kurts et al. .................... | 713/322 |
| 2011/0013522 A1 * | 1/2011 | Kishigami ..................... | 370/242 |
| 2012/0109407 A1 * | 5/2012 | Yousefi et al. .................... | 701/1 |
| 2012/0110356 A1 * | 5/2012 | Yousefi et al. ................ | 713/320 |
| 2013/0044008 A1 * | 2/2013 | Gafford et al. ................ | 340/989 |
| 2013/0078945 A1 * | 3/2013 | Lavi et al. ...................... | 455/410 |
| 2013/0159489 A1 * | 6/2013 | Cha et al. ....................... | 709/223 |

FOREIGN PATENT DOCUMENTS

| | | |
|---|---|---|
| JP | 06030473 A | 2/1994 |
| JP | 10285189 A | 10/1998 |
| JP | 2009-124480 A | 6/2009 |
| JP | 2011-201527 A | 10/2011 |
| KR | 10-1131526 | 3/2012 |

* cited by examiner

*Primary Examiner* — Thomas Black
*Assistant Examiner* — Tyler Paige
(74) *Attorney, Agent, or Firm* — Edwards Wildman Palmer LLP; Peter F. Corless

(57) ABSTRACT

The present invention relates to a system and method for controlling an integrated network of a vehicle, and more particularly, to a system and method, which separately identifies a malfunction of a plurality of communication networks applied to a vehicle and integrally controls power off and power on of the communication networks using a communication gateway. The integrated network system includes: a gateway configured to connect a plurality of networks; a plurality of vehicle networks connected to the gateway and connectable to each other by the gateway; and an Ethernet configured to transmit a signal processed in the gateway to the exterior of the gateway to analyze communication states of the plurality of vehicle networks connected to the gateway.

18 Claims, 7 Drawing Sheets

FIG. 7

| ID (Hex) | Data Field | | | | | | | |
|---|---|---|---|---|---|---|---|---|
| | byte1 | byte2 | byte3 | byte4 | byte5 | byte6 | byte7 | byte8 |
| 4xx | Destination | NMcommandCode + NMSleepFlag | Control function 1 | Control function 2 | Control function 3 | Control function 4 | Control function 5 | Control function 6 |
| Name of corresponding electronic device | Destination | Nmcommand :Sleep/Wakeup command NMSleepFlag :Current state of electronic device (Wakeup, Sleep standby) | Define a name of a function causing communication wakeup → It is easy to analyze a reason of a malfunction phenomenon | | | | | |

※NM : Network Management

SYSTEM AND METHOD FOR CONTROLLING INTEGRATED NETWORK OF A VEHICLE

CROSS-REFERENCE TO RELATED APPLICATION

This application claims priority to and the benefit of Korean Patent Application No. 10-2012-0102853 filed in the Korean Intellectual Property Office on Sep. 17, 2012, the entire contents of which are incorporated herein by reference.

BACKGROUND OF THE INVENTION (a) Field of the Invention

The present invention relates to a system and method for controlling an integrated network of a vehicle, and more particularly, to a system and method, which separately identifies a malfunction of a plurality of communication networks applied to a vehicle and integrally controls a sleep and a wakeup of the communication networks using a communication gateway.

(b) Description of the Related Art

Recently, the installation of integrated electronic devices in a vehicle has increased and thus, communication networks, such as a controller area network (CAN), a local interconnect network (LIN), and a FlexRay, for communication between the electronic devices have been developed.

In general, a communication network applied to a vehicle employs a different communication method in accordance with a characteristic of each domain, such as a body domain, a multimedia domain, a power train domain, and a chassis domain. However, to improve merchantable quality of a vehicle, in each communication network applied to a corresponding domain, a function of transceiving data with a communication network to which a different domain is applied has increased.

Accordingly, the communication network for a vehicle applied to the exemplary embodiment of the related art has a problem with mutual correlation of a communication network to which a different domain is applied. For example, in the exemplary embodiment of the related art, when a CAN 12 applied to a body domain is powered on as illustrated in FIG. 1, a communication network, for example, a multimedia CAN 14 and a power train/chassis CAN 16, applied to a different domain is powered on through a gateway 10 so that data may be transmitted.

Further, when a malfunction is generated in the communication network applied to the body domain so that the communication network of the body domain fails to enter the power off mode, the communication networks applied to the multimedia domain, the power train domain, and the chassis domain cannot enter the power off mode. Additionally, when the malfunction occurs, the communication networks remain in a power on state. Accordingly, current consumed in electronic equipment connected to each communication network increases, thereby causing a problem of excessive discharge of the battery.

The above information disclosed in this section is only for enhancement of understanding of the background of the invention and therefore it may contain information that does not form the prior art that is already known in this country to a person of ordinary skill in the art.

SUMMARY OF THE INVENTION

The present invention has been made in an effort to provide an integrated network system for a vehicle having advantages of preventing a battery from discharging by preventing an increase of current consumed in electronic equipment by identifying a malfunction of a plurality of communication networks integrated in the vehicle and controlling a power on and a power off of the communication networks using a communication gateway.

An exemplary embodiment of the present invention provides an integrated network system for a vehicle, including: a gateway configured to connect a plurality of vehicle networks; and an Ethernet configured to transmit a signal processed in the gateway to the exterior of the gateway to analyze communication states of the plurality of vehicle networks connected to the gateway. The plurality of vehicle networks may include a controller area network (CAN), a local interconnect network (LIN), and a FlexRay.

The gateway may classify received signals of the plurality of vehicle networks, and in response to classifying a signal as a signal for powering on (e.g., wakeup) another network, powering on another network. Additionally, the gateway may store a communication signal value generated in a corresponding network, and in response to generating a new communication signal in the corresponding network, comparing the stored communication signal value with the new communication signal value to power off (e.g., sleep) or power on the corresponding network.

When the stored communication signal value is the same as the new communication signal value, the gateway may power off the corresponding network, and when the stored communication signal value is different than the new communication signal value, the gateway may power on the corresponding network.

When a new communication signal is not generated in the corresponding network for a set time after the communication signal value generated in the network is stored, the gateway may power off the corresponding network.

The gateway may determine, a parking and stopping state of the vehicle through the signals input through the plurality of vehicle networks. When the vehicle is in the parking and stopping state, the gateway may signal the plurality of vehicle networks connected to the gateway to power off. The communication analysis device may be configured to receive a signal processed in the gateway while accessing the Ethernet, and analyze communication states of the plurality of networks based on the signal. Additionally, the communication analysis device may set a login and a power off entry time in a network that is in a communication malfunction state among the plurality of networks.

Data transceived between the plurality of networks connected to the gateway may include a name of a corresponding electronic device, a power off mode or a power on mode command, and data indicating a state of the corresponding electronic device.

As described above, according to the exemplary embodiments of the present invention, it may be possible to prevent a battery from being unnecessarily discharged by preventing an increase of current consumed in electronic equipment by separately identifying a malfunction of a plurality of communication networks applied to a vehicle and integrally controlling power off and power on of the communication networks by using a communication gateway.

BRIEF DESCRIPTION OF THE DRAWINGS

FIG. 7 is an exemplary structure of communication data applied to an integrated network system for a vehicle, according to an exemplary embodiment of the present invention.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
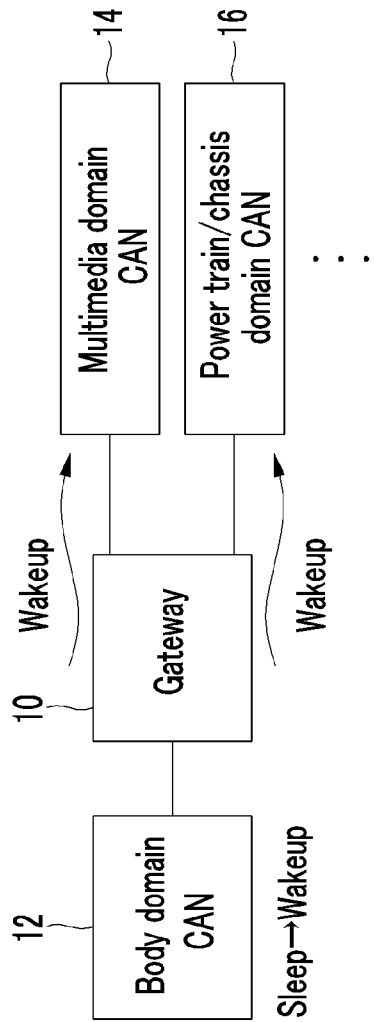
FIG. 1 is an exemplary diagram illustrating an operation of a network system for a vehicle, according to an exemplary embodiment of the related art.
Figure 2:
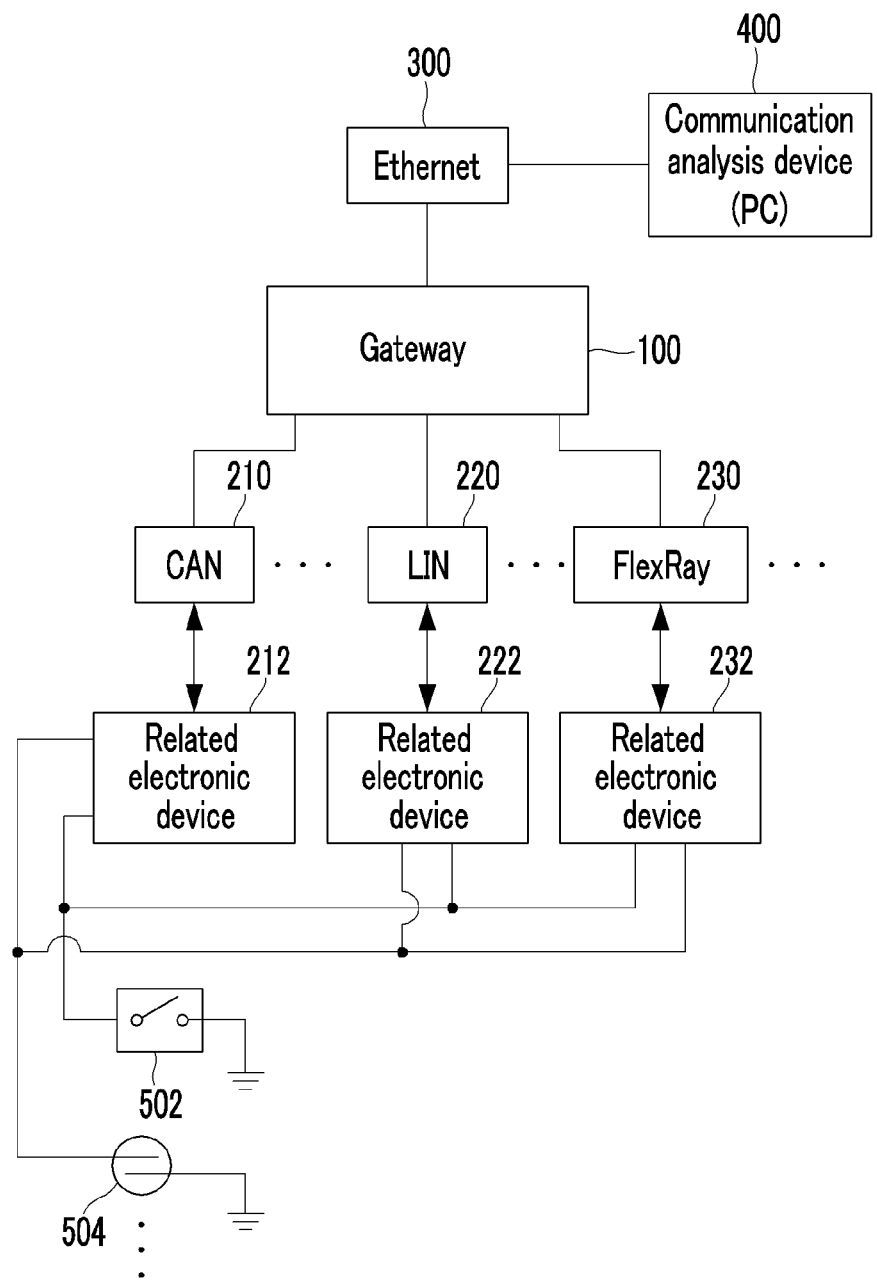
FIG. 2 is an exemplary configuration of an integrated network system for a vehicle, according to an exemplary embodiment of the present invention.

FIG. 2 is an exemplary block diagram illustrating an integrated network system for a vehicle, according to an exemplary embodiment of the present invention. The integrated network system for the vehicle according to the exemplary embodiment of the present invention is an integrated network system for a vehicle in which various networks, such as a CAN, LIN, and FlexRay, applied to a vehicle may be efficiently and integrally operated.

The integrated network system for the vehicle according to the exemplary embodiment of the present invention includes a gateway 100 configured to connect a plurality of networks to each other; a plurality of vehicle networks 210, 220, and 230 connected to the gateway 100 and connectable with each other by the gateway 100; an Ethernet 300 configured to transmit a signal processed in the gateway 100 to the exterior of the gateway to analyze communication states of the plurality of vehicle networks 210, 220, and 230 connected to the gateway 100; and a communication analysis device 400 configured to receive the signal processed in the gateway 100 and analyze the communication states of the vehicle networks 210, 220, and 230 based on the received signal while accessing the Ethernet 300.

The plurality of vehicle networks may be formed of a controller area network (CAN) 210, a local interconnect network (LIN) 220, and a FlexRay 230, but it should be understood that the scope of the present invention is not limited thereto. The technical spirit of the present invention may be applied to the network when a network may establish communication while being connected to the gateway 100. The CAN 210, the LIN 220, and the FlexRay 230 as the plurality of vehicle networks may be obvious to those skilled in the art, thus detailed descriptions thereof will be omitted in the present specification.

FIG. 2, illustrates the CAN 210, the LIN 220, and the FlexRay 230 as the plurality of vehicle networks connected to the gateway 100. Although FIG. 2 illustrates each network connected to the gateway, it should be understood that a plurality of networks may be connected together to the gateway.

The CAN 210 may include an electronic device 212 related to the CAN 210, such as a body control module (BCM) and a door lock motor, included in a body domain. The LIN 220 may include an electronic device 222 related to the LIN 210, such as a sheet and a window. The FlexRay 230 may include an electronic device 232 related to the FlexRay 210, such as an electronic device of a power system (e.g., an engine) and electronic devices for controlling a chassis (e.g., a brake and an steering device). The respective electronic devices 212, 222, and 232 may be connected with a parking brake switch 502 for inputting a signal related to parking and stopping and a vehicle speed sensor 504.

The gateway 100 may include one or more processors or microprocessors and/or hardware operated by a program including a series of commands for executing processes of the flowcharts illustrated in FIGS. 3 to 6, as well as a general operation of the gateway.

The Ethernet 300 serves to transmit a signal processed in the gateway 100 to the communication analysis device 400 to analyze the communication states of the CAN 210, the LIN 220, and the FlexRay 230 connected to the gateway 100. The Ethernet 300 may be a general Ethernet, and a configuration and an operation of the Ethernet are obvious to those skilled in the art, thus the detailed descriptions thereof will be omitted in the present specification.

The communication analysis device 400 may be a communication analysis terminal and may be formed of a personal computer and a notebook computer, but it should be understood that the scope of the present invention is not limited thereto. The scope of the present invention may be applied to a device that may substantially receive a signal transmitted from the gateway 100 through the Ethernet 300 and analyze the corresponding signal.

The communication analysis device 400 may set a login and a power off (e.g., a sleep) entry time in a network which is in a communication malfunction state among the plurality of networks. It will be obvious to those skilled in the art that a program for analyzing the communication may be installed in the communication analysis device 400, thus detailed disclosure thereof will be omitted.

An operation of the integrated network system for the vehicle including the aforementioned configuration according to the exemplary embodiment of the present invention will be described in detail with reference to the accompanying drawings.

Figure 3:
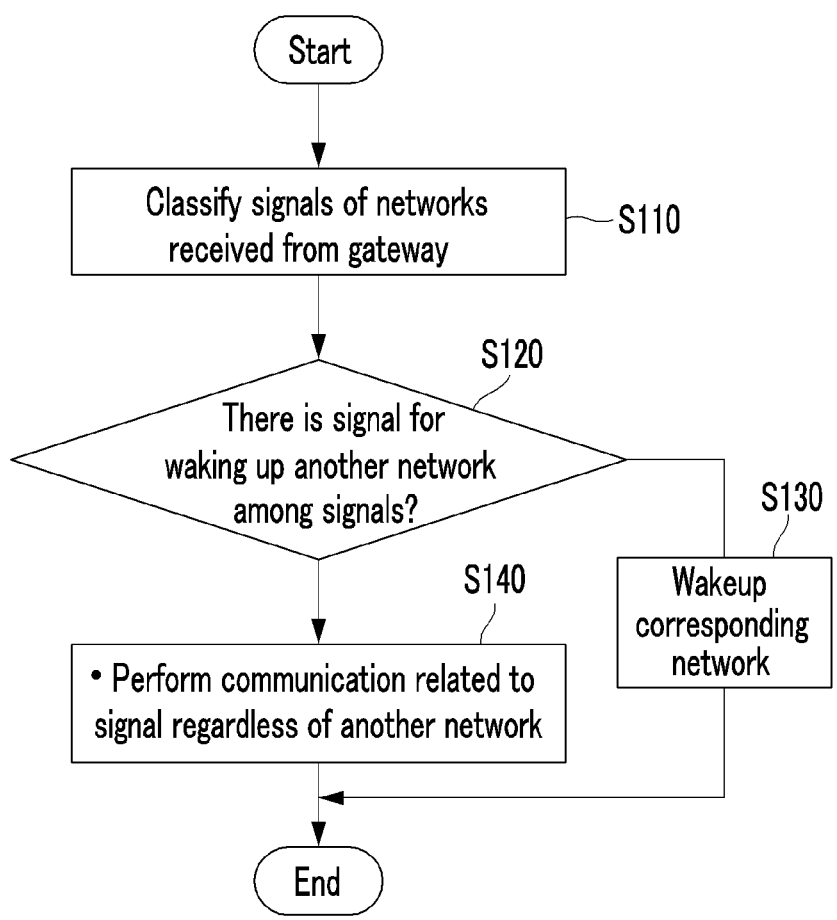
FIGS. 3 to 6 are exemplary flowcharts of a process implemented by an integrated network system for a vehicle, according to an exemplary embodiment of the present invention.

Referring to FIG. 3, the gateway 100 may classify the plurality of signals received through the connected CAN 210, LIN 220, and FlexRay 230. Furthermore, the gateway 100 may classify the signals by using an identification code (ID) or a destination byte of signal data, and a network management (NM) command code as illustrated in FIG. 7 (S110). As illustrated in FIG. 7, a structure of the signal data may be divided into an identification code field and a data field. A destination may be recorded in byte 1 of the data field, NMcommandCode and NMSleepFlag may be recorded in byte 2, and control functions may be recorded in byte 3 to byte 8.

Particularly, in byte 2, a power off or power on (e.g., sleep or wakeup) command may be recorded as the NMcommand, and a current state, for example, wakeup or sleep standby, of an electronic device may be recorded as the NMSleepFlag. For example, a name of a function causing the communication power on may be recorded in byte 3 to byte 8 in which a control function is recorded, so the communication malfunction may be easily analyzed through the name of the function.

After step S110, the communication analysis device 400 may identify a signal for powering on another network among the signals classified by the gateway 100 (S120). When there exists a powering on signal for another network among the signals classified by the gateway 100, the gateway 100 may transmit the signal for powering on the corresponding network to the corresponding network to power on the corresponding network (S 130).

When no signal for powering on another network among the signals classified by the gateway 100 is present, the gateway 100 may communicate only within the network thereof regardless of another network, and signal another network to maintain a current state or a power off state (S 140). Accordingly, the integrated network system for the vehicle may separately identify the plurality of communication networks. In other words, the integrated network system for the vehicle may separately identify the power off and the power on of the networks.

Figure 4:
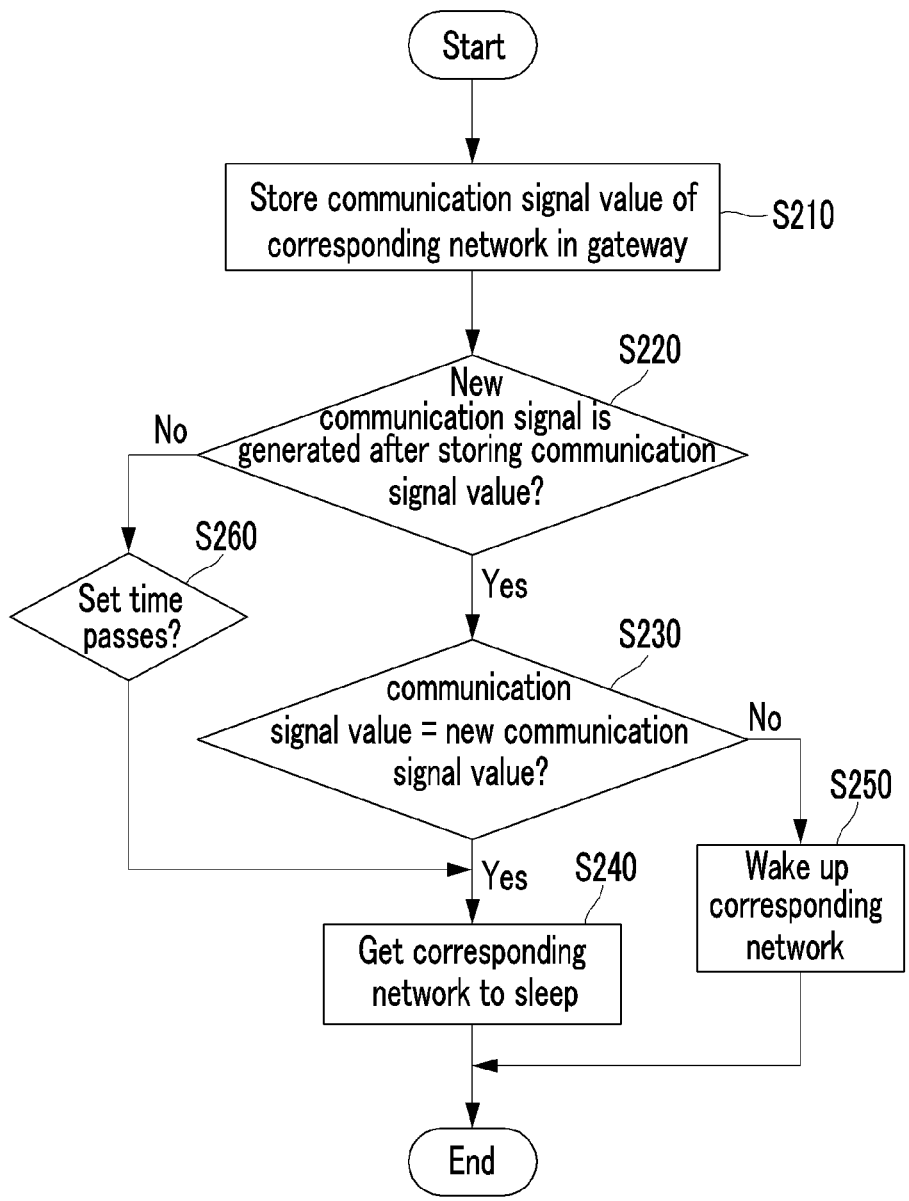

Referring to FIG. 4, the gateway 100 may store communication signals of the respective networks received from the plurality of connected networks, that is, the CAN 210, the LIN 220, and the FlexRay 230, in a memory (not illustrated) (S210). After storing the communication signal in the memory, the gateway 100 may determine whether a new communication signal is received (e.g., generated) (S220).

In step S220, when the new communication signal is received, the gateway 100 may compare the communication signal previously stored in the memory and the new communication signal (S230). As a result of the comparison in step S230, when the communication signal stored in the memory is matched with the new communication signal, the gateway 100 may power off the corresponding network (S240), but when the communication signal stored in the memory is not matched with the new communication signal, the gateway 100 may power on the corresponding network (S250). Additionally, when the new communication signal is not received for a set time (S260), the gateway network 100 may power off the corresponding network (S240). Accordingly, the integrated network system for the vehicle may separately control the power off and the power on of the plurality of communication networks.

Figure 5:
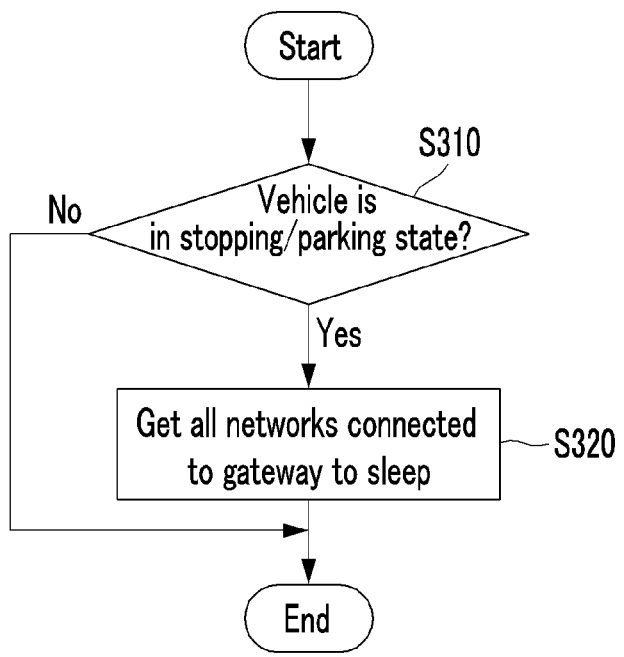

Referring to FIG. 5, the gateway 100 may receive a signal of the parking brake switch 502 and a signal of the vehicle speed sensor 504 communicated through the plurality of networks 210, 220, and 230. Furthermore, the gateway 100 may determine when the vehicle is in a state of parking or stopping based on the signal of the parking brake switch 502 and the signal of the vehicle speed sensor 504 (S310). When the signal of the parking brake switch 502 is engaged and the signal of the vehicle speed sensor 504 is 0, the gateway 100 may determine that the vehicle is parked or stopped.

In step S310, when the gateway 100 determines that the vehicle is parked, the gateway 100 may power the connected networks 210, 220, and 230 to prevent waste of the power that may be unnecessarily consumed while the vehicle is parked. Accordingly, the integrated network system for the vehicle may maintain the power on states of the networks when the communication has a malfunction in the parking/stopping which a dark current blocking device may not solve according to the exemplary embodiment of the related art, thereby solving the problem of the battery overdischarge.

Figure 6:
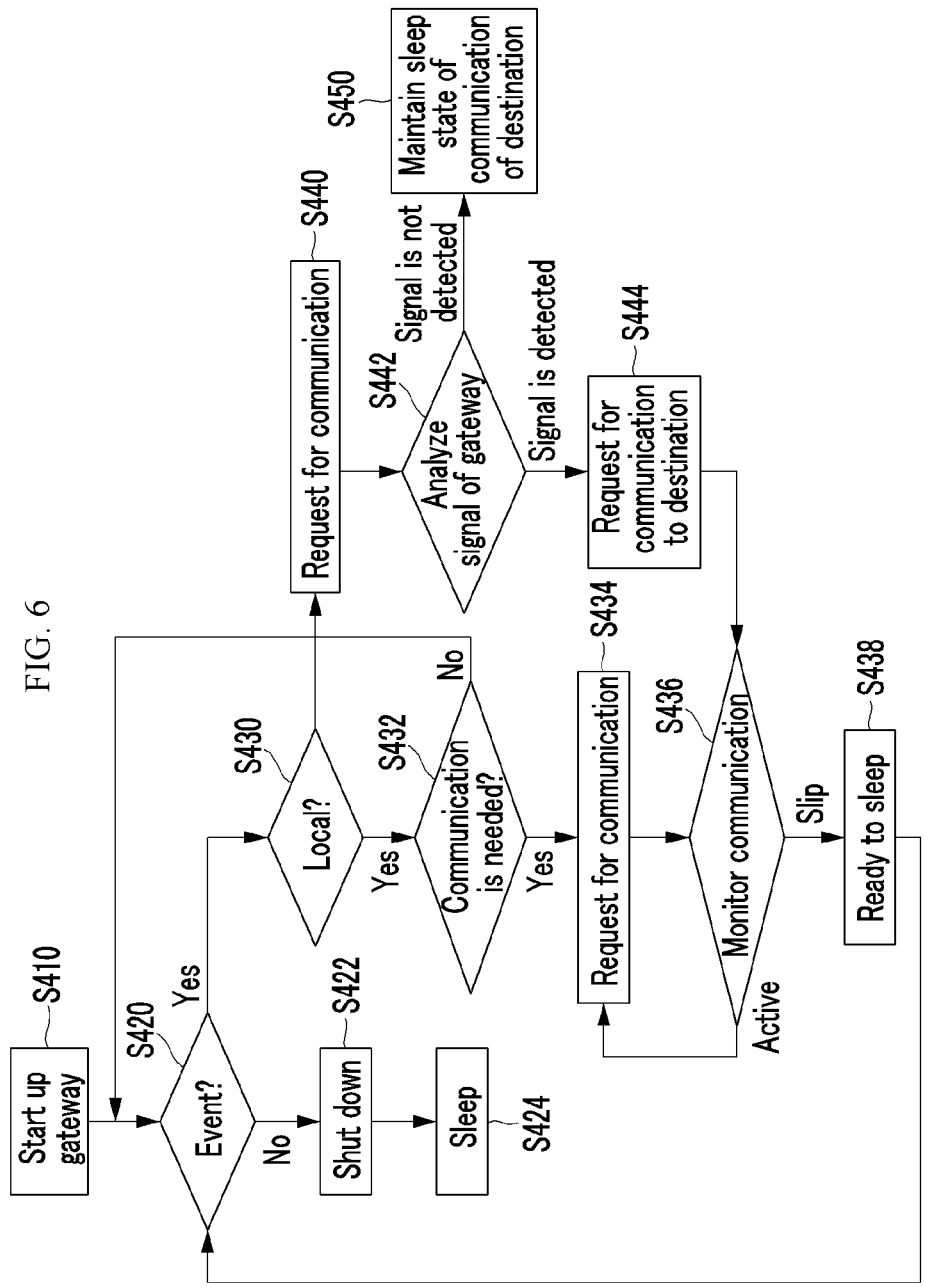

FIG. 6 is an exemplary flowchart for writing a control process program implemented in the integrated network system for the vehicle according to the exemplary embodiment of the present invention. Referring to FIG. 6, the gateway 100 may be powered on in step S410 the gateway 100 may determine when an event is generated (S420).

When the event is not generated in step S420, the gateway 100 may shut down a corresponding network or signal the corresponding network to power off (S422 and S424). When the event is generated in step S420, the gateway 100 may determine when the event is generated in a local (S430). When the event is generated in the local, the gateway 100 may determine when communication is necessary (S432). When the communication is necessary, the gateway 100 may request for the communication (S434), but when the communication is not necessary, the gateway 100 may return to step S420 to determine when a new event is generated.

When making the request for the communication, the gateway 100 may enable transmission (tx) and reception (Rx) of only a network requiring the reception with reference to an operation function in the communication data (see FIG. 7).

In step S434, after making the request for the communication, the gateway 100 may monitor the communication (S436). When the communication is active, the gateway 100 may request for the communication necessary in step S434, and when the communication is not active, the gateway 100 may prepare the corresponding network to power off (NM-ShutdownTime) (S438). In monitoring the communication, a transition condition may be divided into a low priority and a high priority, a description of which will be described below.

In relation to the transition condition of the low priority, when two conditions below are all satisfied, the corresponding network may be transitioned to step S438 of the prepare to power off.

First condition: when an application reception signal (Rx) for each network is maintained for a set time (e.g., 5.5 seconds), the gateway 100 may transition the corresponding network to the prepare to power off.

Second condition: when a gateway signal value of a source network is the same as a start value for a set time (e.g., 1.5 seconds) or no message exists for a set time (e.g., 1.5 seconds), the gateway 100 may transition a destination network to the prepare to power off.

Additionally, the contents of the transition of the high priority will be described below.

First: when a predetermined network is in a communication active state even though NMShutdownTime (see FIG. 7) passes after the transition from an ignition power (IGN) condition to a battery power (B+) condition, the gateway 100 may turn off the transmission (tx) of all networks.

Second: when a specific electronic device transmits communication data after an ignition power (IGN) condition is transitioned to a battery power (B+) condition and NMShutdownTime passes, the gateway 100 may store a node name, the number of times of power on, and a final network management (NM) state of a corresponding electronic device in an electronically erasable programmable read only memory (EEPROM).

The stored data may be transmitted to the communication analysis device 400 through the Ethernet 300 to be displayed on the communication analysis device 400. The network management shut down time (NMShutdownTime) may be changed through the communication analysis device 400. When determined that the event is not generated in the local in step S430, the gateway 100 may request the communication to another network (S440). After requesting the communication in step S440, a signal of the gateway 100 may be analyzed (S442). When the signal is not detected, the destination network may be maintained in the power off state (S450), and when the signal is detected, the communication may be requested to the designation network (S444), and the communication may be monitored after the communication is requested to the designation network (S436).

In the analysis of the signal of the gateway 100 in step S442, a change may not be sensed when the gateway signal value of the source network is the same as the start value or the event signal is not generated. Accordingly, according to the integrated network system for the vehicle, it may be possible to prevent the network from incorrectly powering on, and it may be possible to monitor and detect a network having a malfunction when a communication malfunction is generated in the parking/stopping condition.

Further, it may be possible to provide information on a function causing the malfunction of the electronic device, thereby analyzing the cause of the malfunction, and it may be possible to solve a problem of excessive dark current of the vehicle, through the integral control of the power on and the power off. In addition, the integrated network system for the vehicle may employ various communication methods, such as the LIN and the FlexRay, in addition to the CAN communication, to prevent the need for additional hardware to reduce dark current. Accordingly, the integrated network system for the vehicle may solve the battery discharge problem and detect the communication malfunction cause when the communication malfunctions.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. An integrated network system for a vehicle, comprising:
   a gateway configured to connect a plurality of vehicle networks;
   a plurality of vehicle networks connected to the gateway and connectable to each other by the gateway; and
   an Ethernet configured to transmit a signal processed in the gateway to the exterior of the gateway to analyze a plurality of communication states of the plurality of vehicle networks connected to the gateway,
   wherein the gateway classifies a plurality of received signals of the plurality of vehicle networks, and when a signal for powering on another network is detected among the classified signals, the gateway powers on the corresponding network.

2. The integrated network system of claim 1, wherein the plurality of vehicle networks comprises a controller area network (CAN), a local interconnect network (LIN), and a FlexRay.

3. The integrated network system of claim 2, wherein the gateway classifies a plurality of received signals of the plurality of vehicle networks, and when a signal for powering on another network is detected among the classified signals, the gateway powers on the corresponding network.

4. The integrated network system of claim 2, wherein the gateway is further configured to:
   store a communication signal value generated in a corresponding network;
   in response to determining a new communication signal generated in the corresponding network, compare the stored communication signal value with the new communication signal value to power off or power on the corresponding network to.

5. The integrated network system of claim 4, wherein the gateway is further configured to:
   power off the corresponding network when the stored communication signal value is the same as the new communication signal value; and
   power on the corresponding network when the stored communication signal value is different from the new communication signal value.

6. The integrated network system of claim 4, wherein the gateway is further configured to power off the corresponding network when a new communication signal is not generated in the corresponding network for a set time after the communication signal value generated in the network is stored.

7. The integrated network system of claim 2, wherein the gateway is further configured to:
   determine a parking and stopping state of the vehicle using the signals input through the plurality of vehicle networks; and
   power off the plurality of vehicle networks when the vehicle is in the parking and stopping state.

8. The integrated network system of claim 1, further comprising a communication analysis device configured to:
   receive a signal processed in the gateway while accessing the Ethernet; and
   analyze communication states of the plurality of networks based on the signal.

9. The integrated network system of claim 7, wherein the communication analysis device is further configured to set a login and a power off entry time in a network that is in a communication malfunction state among the plurality of networks.

10. The integrated network system of claim 1, wherein data transceived between the plurality of networks connected to the gateway includes a name of a corresponding electronic device, a power off mode or a power on mode command, and data indicating a state of the corresponding electronic device.

11. A method for controlling an integrated network system, the method comprising:

classifying, by a gateway, a plurality of received signals of a plurality of vehicle networks connected in the gateway;

detecting, by the gateway, a signal for powering on another network among the plurality of classified signals; and powering on, by the gateway, a corresponding network through the detected signal, when a signal for powering on another network among the plurality of the classified signals exists.

12. The method of claim 11, further comprising:

storing, by the gateway, a communication signal value generated in the corresponding network;

determining, by the gateway, a new communication signal value generated in the corresponding network;

comparing, by the gateway, the stored communication signal value with the new communication signal value;

powering off, by the gateway, the corresponding network when the stored communication signal value is the same as the new communication signal value;

powering on, by the gateway, the corresponding network when the stored communication signal value is different from the new communication signal value; and powering off, by the gateway, the corresponding network when the new communication signal value is not generated in the corresponding network for a set time after the communication signal value generated in the corresponding network is stored.

13. The method of claim 11, further comprising:

transmitting, by the gateway, a processed signal from the plurality of received signals to a communication analysis device via an Ethernet to analyze a plurality of communication states of the plurality of networks based on the processed signal.

14. The method of claim 13, further comprising powering off, by the gateway, the corresponding network when a parking and stopping state of the vehicle is determined using the signals input through the plurality of vehicle networks.

15. A non-transitory computer readable medium containing program instructions executed by a processor or controller, the computer readable medium comprising:

program instructions that control a gateway to connect a plurality of vehicle networks;

program instructions that control the gateway to classify a plurality of received signals of the plurality of vehicle networks;

program instructions that control the gateway to detect a signal for powering on another network among the plurality of classified signals; and program instructions that control the gateway to power on a corresponding network through the detected signal, when a signal for powering on another network among the plurality of the classified signals exists.

16. The computer readable medium of claim 15, further comprising:

program instructions that control the gateway to store a communication signal value generated in the corresponding network;

program instructions that control the gateway to determine a new communication signal value generated in the corresponding network;

program instructions that control the gateway to compare the stored communication signal value with the new communication signal value;

program instructions that control the gateway to power off the corresponding network when the stored communication signal value is the same as the new communication signal value;

program instructions that control the gateway to power on the corresponding network when the stored communication signal value is different from the new communication signal value; and program instructions that control the gateway to power off the corresponding network when the new communication signal value is not generated in the corresponding network for a set time after the communication signal value generated in the corresponding network is stored.

17. The computer readable medium of claim 15, further comprising:

program instructions that control the gateway to transmit a processed signal from the plurality of received signals to a communication analysis device via an Ethernet to analyze a plurality of communication states of the plurality of networks based on the processed signal.

18. The computer readable medium of claim 17, further comprising:

program instructions that control the gateway to power off the corresponding network when a parking and stopping state of the vehicle is determined using the signals input through the plurality of vehicle networks.

\* \* \* \* \*